(12) United States Patent
Lutze et al.

(10) Patent No.: US 9,787,107 B2
(45) Date of Patent: Oct. 10, 2017

(54) APPARATUS AND METHOD FOR STATE OF CHARGE COMPENSATION FOR A BATTERY SYSTEM

(71) Applicant: Siemens Aktiengesellschaft, München (DE)

(72) Inventors: Marcel Lutze, Nürnberg (DE); Dragan Mikulec, Erlangen (DE); Timur Werner, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 130 days.

(21) Appl. No.: 14/790,817

(22) Filed: Jul. 2, 2015

(65) Prior Publication Data

US 2016/0006277 A1 Jan. 7, 2016

(30) Foreign Application Priority Data

Jul. 3, 2014 (DE) ...................... 10 2014 212 933.8

(51) Int. Cl.
*H02J 7/00* (2006.01)
*H02J 1/00* (2006.01)
(Continued)

(52) U.S. Cl.
CPC ............ *H02J 7/0016* (2013.01); *H02J 7/007* (2013.01); *H02J 7/0021* (2013.01); *H02M 3/158* (2013.01);
(Continued)

(58) Field of Classification Search
CPC ......... H02J 7/0016; H02J 7/0021; H02J 7/007
(Continued)

(56) References Cited

U.S. PATENT DOCUMENTS 5,619,417 A * 4/1997 Kendall ................ B60L 3/0046
307/10.1
5,945,806 A * 8/1999 Faulk .................. H01M 10/425
320/127
(Continued)

FOREIGN PATENT DOCUMENTS

CN 201438493 U 4/2010
CN 202435080 U 9/2012
(Continued)

*Primary Examiner* — M'Baye Diao
(74) *Attorney, Agent, or Firm* — Henry M. Feiereisen LLC

(57) ABSTRACT

The invention relates to an apparatus (2) for state of charge compensation having a battery system (10) for providing electrical energy comprising a series connection of a first battery sub-module (13) and a second battery sub-module (13') having a first voltage conversion module (20') wherein the first voltage conversion module (20') is electrically connected to the second battery sub-module (13'), and wherein an electrical component (30) can be connected to the first voltage conversion module (20') and can be supplied with electrical energy from the connected second battery sub-module (13'), wherein the apparatus (2) has a switching device (26) for switching an electrical connection between the first battery sub-module (13) and the first voltage conversion module (20') and wherein the apparatus (2) has a control device (11) which is designed to control the switching device (26) such that electrical energy flows from the first battery sub-module (13) to the second battery sub-module (13') and/or that electrical energy flows from the second battery sub-module (13') to the first battery sub-module (13).

12 Claims, 2 Drawing Sheets

(51) Int. Cl.
  *H02M 3/158* (2006.01)
  *H02M 1/00* (2006.01)
(52) U.S. Cl.
  CPC .. *H02M 2001/0074* (2013.01); *Y02T 10/7055* (2013.01)
(58) Field of Classification Search
  USPC .......................................... 320/103; 307/82
  See application file for complete search history.

(56) References Cited

U.S. PATENT DOCUMENTS

| | | | | |
|---|---|---|---|---|
| 5,945,807 | A * | 8/1999 | Faulk | H02J 7/0065 320/128 |
| 6,373,226 | B1 | 4/2002 | Itou et al. | |
| 8,710,801 | B2 * | 4/2014 | Schwartz | H02J 7/0016 320/119 |
| 9,178,354 | B2 * | 11/2015 | Oleynik | H02J 3/01 |
| 9,547,045 | B2 * | 1/2017 | Gibbs | G01R 31/3624 |
| 2007/0219670 | A1 * | 9/2007 | Tanaka | H01M 10/482 700/295 |
| 2008/0278115 | A1 * | 11/2008 | Huggins | B60L 3/12 320/134 |
| 2009/0251100 | A1 * | 10/2009 | Incledon | H02J 7/0026 320/106 |
| 2011/0194277 | A1 * | 8/2011 | Yamaguchi | H02J 1/10 362/183 |
| 2012/0074907 | A1 | 3/2012 | Roeper | |
| 2013/0141048 | A1 * | 6/2013 | Huang | H02J 7/0021 320/118 |
| 2013/0257383 | A1 * | 10/2013 | Shim | H02J 3/32 320/134 |
| 2013/0320918 | A1 * | 12/2013 | Ohmer | H01M 10/4207 320/107 |
| 2014/0001863 | A1 * | 1/2014 | Zhang | G21D 1/02 307/66 |
| 2014/0009106 | A1 * | 1/2014 | Andrea | H02H 9/002 320/107 |
| 2015/0056475 | A1 * | 2/2015 | Adrian | H01M 10/4257 429/7 |
| 2015/0130281 | A1 * | 5/2015 | Sabripour | H02J 3/32 307/66 |
| 2015/0194707 | A1 * | 7/2015 | Park | H01M 10/4207 429/50 |

FOREIGN PATENT DOCUMENTS

| | | |
|---|---|---|
| DE | 102011077708 A1 | 12/2012 |
| EP | 0695017 A2 | 1/1996 |
| EP | 2608397 A1 | 6/2013 |
| WO | WO 2004073157 A2 | 8/2004 |
| WO | WO 2010093186 A2 | 8/2010 |

* cited by examiner

APPARATUS AND METHOD FOR STATE OF CHARGE COMPENSATION FOR A BATTERY SYSTEM

CROSS-REFERENCES TO RELATED APPLICATIONS

This application claims the priority of German Patent Application, Serial No. 10 2014 212 933.8, filed Jul. 3, 2014, pursuant to 35 U.S.C. 119(a)-(d), the content of which is incorporated herein by reference in its entirety as if fully set forth herein.

BACKGROUND OF THE INVENTION

The present invention relates to an apparatus for state of charge compensation in a battery system having a series connection of a first battery sub-module and a second battery sub-module and having a first voltage conversion module, wherein an electrical component can be connected to the first voltage conversion module and can be supplied with the electrical energy from the connected second battery sub-module.

The following discussion of related art is provided to assist the reader in understanding the advantages of the invention, and is not to be construed as an admission that this related art is prior art to this invention.

To supply power to electrical components, electrical energy/power storage devices are generally provided. Such energy/power storage devices can be, for example, battery cells which provide a battery cell voltage. In order to provide a desired voltage level, the battery cells are normally interconnected to form battery stacks. In low-voltage applications, voltages of less than 60 V are usually provided, in high-voltage applications, voltages of more than 60 V, in particular of more than 100 V, are usually provided. Energy storage devices in high-voltage applications can be designed, for example, to supply power to electrical machines, e.g. electric motors in motor vehicles. In addition, capacitors, for example, can be used as electrical energy stores.

Particularly for high-voltage applications, the voltage of single battery stacks is generally insufficient. To achieve a higher voltage, in particular a voltage in the high-voltage range, it can be provided that a plurality of battery stacks is used to supply an electrical component, e.g. an electric motor. For this purpose a plurality of battery stacks are usually connected in series to form a battery system to which an electrical component to be supplied is connected. The sum of the voltages of the individual battery stacks is therefore available to the electrical component.

Because of possible different battery cell chemicals, aging effects, manufacturing tolerances and loading profiles, the battery stacks may exhibit differing charge states and different impedances. As a result, the series-connected battery stacks are discharged and charged differently during operation, in which case they may assume critical charge states. The different charge states are generally compensated using so-called state of charge compensation or balancing methods. Without appropriate balancing, service-life-extending and full utilization of the entire installed battery energy is impossible, or it would be necessary to accept an operating strategy that would limit a possible operating range of the battery system.

In the prior art, so-called dissipative balancing methods are currently mainly used. Here the battery stack or battery cell having the highest state of charge is discharged by converting the charging energy of said battery stack or battery cell into heat by way of a parallel-connected resistor. The excess energy of the more heavily charged battery stack or battery cell is therefore reduced via losses in ohmic balancing resistors. This balancing process is generally monitored by a battery management system.

These dissipative methods are generally energy-inefficient and involve high costs due to the complex monitoring by the battery management system.

It would therefore be desirable and advantageous to obviate prior art shortcomings and to provide an improved apparatus and a method for state of charge compensation which is energy-efficient and inexpensive and with which the service life of the battery system can be extended.

SUMMARY OF THE INVENTION

According to one aspect of the present invention, an apparatus for state of charge compensation includes a battery system supplying electrical energy and having a first battery sub-module and a second battery sub-module connected in series with the first battery sub-module, a first voltage conversion module electrically connected to the second battery sub-module, an electrical component connected to an output of the first voltage conversion module receiving electrical energy from the second battery sub-module, a switching device having two switching states and configured to switch an electrical connection between the first battery sub-module and the first voltage conversion module, and a control device configured to control the switching device so as to enable electrical energy to flow from the first battery sub-module to the second battery sub-module or from the second battery sub-module to the first battery sub-module, or both.

According to another aspect of the present invention, a method for state of charge compensation includes providing a battery system having a first battery sub-module and a second battery sub-module connected in series with the first battery sub-module; electrically connecting the first battery sub-module to a first voltage conversion module; connecting an electrical component to the first voltage conversion module and supplying the electrical component with the electrical energy from the second battery sub-module; switching, with a switching device, an electrical connection between the first battery sub-module and the first voltage conversion module; and controlling a flow of electrical energy from the first battery sub-module to the second battery sub-module, or controlling a flow of electrical energy from the second battery sub-module to the first battery sub-module.

In other words, this means that to the switching device additionally electrically connects the first voltage conversion module, which is electrically connected to the second battery sub-module, to the first battery sub-module. A circuit is therefore formed which comprises the switching device, the first battery sub-module, and the first voltage conversion module. By way of the switching device, a flow of energy is therefore possible from the first battery sub-module to the second battery sub-module and/or from the second battery sub-module to the first battery sub-module. The invention is based on the recognition that the energy which is drawn from one of the battery sub-modules can be stored by way of the first voltage conversion module in order then to be fed to another of the battery sub-modules. The energy flow, in particular the direction of the energy flow, can be controlled by the control device. The energy flow can be used for state of charge compensation. The energy used for state of charge compensation is therefore exchanged between the battery sub-modules and therefore efficiently utilized. In particular, the energy of a battery sub-module is not converted into heat via an ohmic resistors and therefore lost, but is fed to another battery sub-module as charging energy. The apparatus is therefore of particularly energy-efficient design.

According to an advantageous feature of the present invention, the first voltage conversion module may include an inductor which may be electrically connected to the first battery sub-module by way of the switching device. The inductor which is electrically connected to the second battery sub-module can therefore be additionally electrically connected to the first battery sub-module by the switching device. A circuit comprising the switching device, the first battery sub-module and the inductor is therefore formed. The inductor enables energy to flow bidirectionally in the apparatus according to the invention, i.e. from the first battery sub-module to the second battery sub-module and/or from the second battery sub-module to the first battery sub-module. The electrical energy which is drawn from one of the battery sub-modules can therefore be temporarily stored in the inductor as magnetic energy in order eventually to be fed to another of the battery sub-modules for charging. By using the inductor of the first voltage conversion modules as an energy store, the apparatus can be implemented very cost effectively.

Advantageously, the control device controls the switching device such that, in a first switching state of the switching device, electrical energy flows from the first battery sub-module to the second battery sub-module. Alternatively or additionally, the control device controls the switching device such that, in a second switching state of the switching device, electrical energy flows from the second battery sub-module to the first battery sub-module. Therefore, electrical energy can be drawn from one of the battery sub-modules and fed to another of the battery sub-modules as charging energy according to demand and in a selective manner.

According to another advantageous feature of the present invention, the control device may be configured to set the first switching state when a state of charge of the first battery sub-module is greater than a state of charge of the second battery sub-module, and to set the second switching state when a state of charge of the second battery sub-module is greater than a state of charge the first battery sub-module. The control device can therefore be designed to detect the state of charge of each of the battery sub-modules. When the state of charge of the first battery sub-module is greater than the state of charge of the second battery sub-module, some of the energy of the first battery sub-module can be fed to the second battery sub-module for state of charge balancing via the switching device controlled by the control device. Conversely, some of the energy of the second battery sub-module can be fed via the switching device controlled by the control device to the first battery sub-module for state of charge balancing when the second battery sub-module has a higher state of charge than the first battery sub-module. Thus a quantity of energy drawn from one battery sub-module can be used as charging energy for another battery sub-module. In particular, the charging energy of the more heavily charged battery sub-module is not deliberately lost in the form of heat via ohmic balancing resistors.

According to another advantageous feature of the present invention, the control device may be configured to control a first length of time during which the switching device is in the first switching state, and/or a second length of time during which the switching device is in the second switching state. This makes it possible to ensure that a balancing process, i.e. transmission of energy from one battery sub-module to another battery sub-module, can be terminated. However, only a partial amount of energy drawn from a battery sub-module may alternatively be fed to another battery sub-module. The remaining amount of energy can be fed back into the battery sub-module from which it was drawn. This feedback process requires a longer time duration which can be taken into account by way of the control device. The apparatus is therefore of particularly low-loss design.

According to another advantageous feature of the present invention, the apparatus may include at least one third battery sub-module and at least one second voltage conversion module. The apparatus can therefore be expanded to include further battery modules and voltage conversion modules if, for example, a larger amount of energy is required for operating one and/or more electrical components. The apparatus is therefore scalable in respect of voltage level.

According to an advantageous feature of the method of the present invention, an electrical connection can be switched from the first battery sub-module to the first voltage conversion module by the switching device, the electrical energy flow from the first battery sub-module to the first voltage conversion module can be controlled, the electrical energy transported by the electrical energy flow can be converted into magnetic energy with an inductor disposed in the first voltage conversion module and stored in the inductor, and an electrical connection between the inductor and the second battery sub-module can be switched, thereby releasing and converting the magnetic energy stored in the inductor into electrical energy for the second battery sub-module.

In embodiment it is assumed that the state of charge of the first battery sub-module is greater than the state of charge of the second battery sub-module. In order to draw energy from the first battery sub-module, the switching device is electrically connected to the inductor of the first voltage conversion module which is connected to the second battery sub-module. The energy provided by the first battery sub-module is temporarily stored as magnetic energy in the inductor. The inductor is now electrically connected to the second battery sub-module. The inductor releases the stored magnetic energy as electrical energy which is fed to the second battery sub-module for charging the second battery sub-module.

Alternatively or additionally, the method includes switching an electrical connection of the inductor between the first voltage conversion module and the second battery sub-module, converting the electrical energy transported by the electrical energy flow from the second battery sub-module into magnetic energy by way of the inductor and storing of the magnetic energy in the inductor, switching with the switching device an electrical connection between the inductor and the first battery sub-module, controlling the energy flow from the inductor to the first battery sub-module, and then releasing and converting the magnetic energy stored in the inductor into electrical energy for the first battery sub-module.

In this embodiment it is assumed that the state of charge of the second battery sub-module is greater than the state of charge of the first battery sub-module. in order to draw energy from the first battery sub-module, the inductor of the first voltage conversion module is electrically connected to the second battery sub-module. The energy provided by the second battery sub-module is temporarily stored as magnetic energy in the inductor. The inductor is now electrically connected to the first battery sub-module. The inductor delivers the stored magnetic energy as electrical energy which is fed to the first battery sub-module for charging the first battery sub-module.

A particular energy-efficient and low-loss balancing method can therefore be implemented by way of a single switching device.

The preferred forms of embodiment described with reference to the apparatus according to the invention and the advantages thereof apply mutatis mutandis also to the method according to the invention and preferred embodiments thereof.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
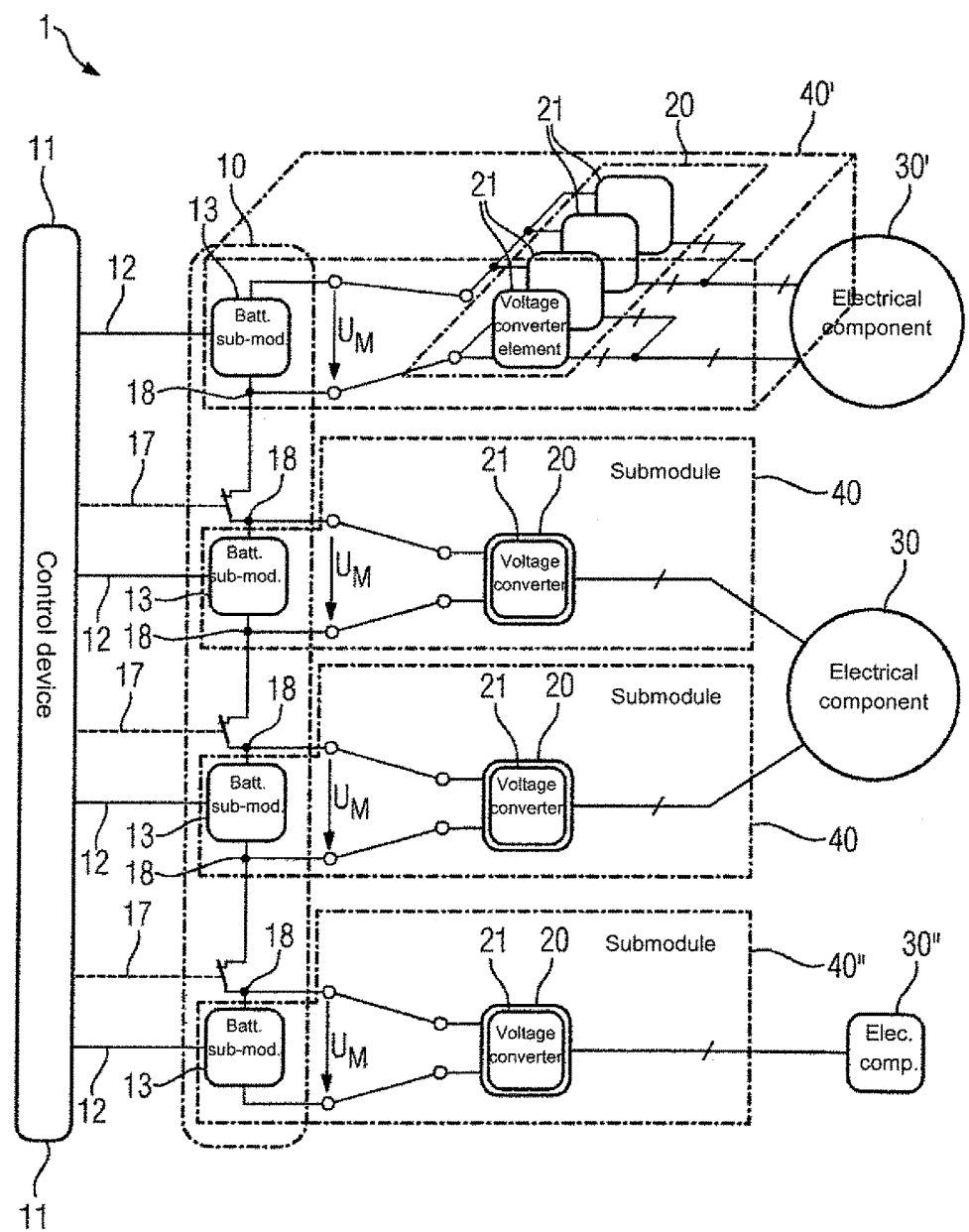
FIG. 1 illustrates schematically a drive arrangement.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The exemplary embodiment explained below is a preferred form of embodiment of the invention. In the exemplary embodiment, however, the described components of the form of embodiment each represent features of the invention that are to be considered independently of one another and which also further develop the invention independently of one another in each case and are therefore also to be regarded individually, or in a combination other than that shown, as an integral part of the invention. In addition, the form of embodiment described can also be supplemented by other of the already described features of the invention.

Turning now to the drawing, and in particular to FIG. 1, there is shown a drive arrangement 1 which can be used, for example, in a motor vehicle or in a wind turbine. A plurality of battery sub-modules 13, also known as battery stacks, is connected in series via coupling devices 17 to form a battery system 10. The switching devices 17 can be controlled by way of a control device 11 via control buses 12. A battery sub-module voltage $U_M$ is dropped across each of the battery sub-modules 13. Disposed between the individual battery sub-modules 13 of the battery system 10 are voltage taps 18 via which a voltage conversion module 20 can be connected to each battery sub-module 13. The battery sub-module voltage $U_M$ of a battery sub-module 13 is now dropped across the voltage conversion module 20 that is electrically connected to the battery sub-module 13. A battery sub-module 13 and a connected voltage conversion module 20 form a submodule 40, 40', 40" in each case. Electrical loads 30, 30', 30" can be supplied with energy by way of the submodules 40, 40', 40".

Within the upper submodule 40', the voltage conversion module 20 comprises a plurality of parallel-connected voltage conversion elements 21 to which an electrical component 30', in particular an electric motor, is connected. The parallel connection of the voltage conversion elements 21 is used for current scaling.

In this exemplary embodiment, a single electrical component 30 is connected to the two middle submodules 40. As a result, twice the battery sub-module voltage $U_M$ is fed to the electrical component 30. The series connection of the submodules 40 to which the electrical component 30 is connected is used for voltage scaling.

The lower submodule 40" supplies energy to an electrical component 30" which is here implemented as a DC load. The voltage conversion element 21 of the voltage conversion module 20 is here implemented, for example, as a DC/DC converter, in particular as a step-up converter.

FIG. 1 therefore shows that the battery sub-modules 13 can be loaded arbitrarily and independently of one another. This can result in different states of charge of the battery sub-modules 13. However, the battery sub-modules 13 may also have differing states of charge and different internal impedances because of possible different battery cell chemistry, aging effects and manufacturing tolerances of the battery sub-modules 13. In order now to achieve optimally efficient state of charge compensation, i.e. of the voltage levels, between the individual battery stacks 13 even when any electrical loads 30, 30', 30" are present, the drive arrangement 1 is extended as shown in FIG. 2.

Figure 2:
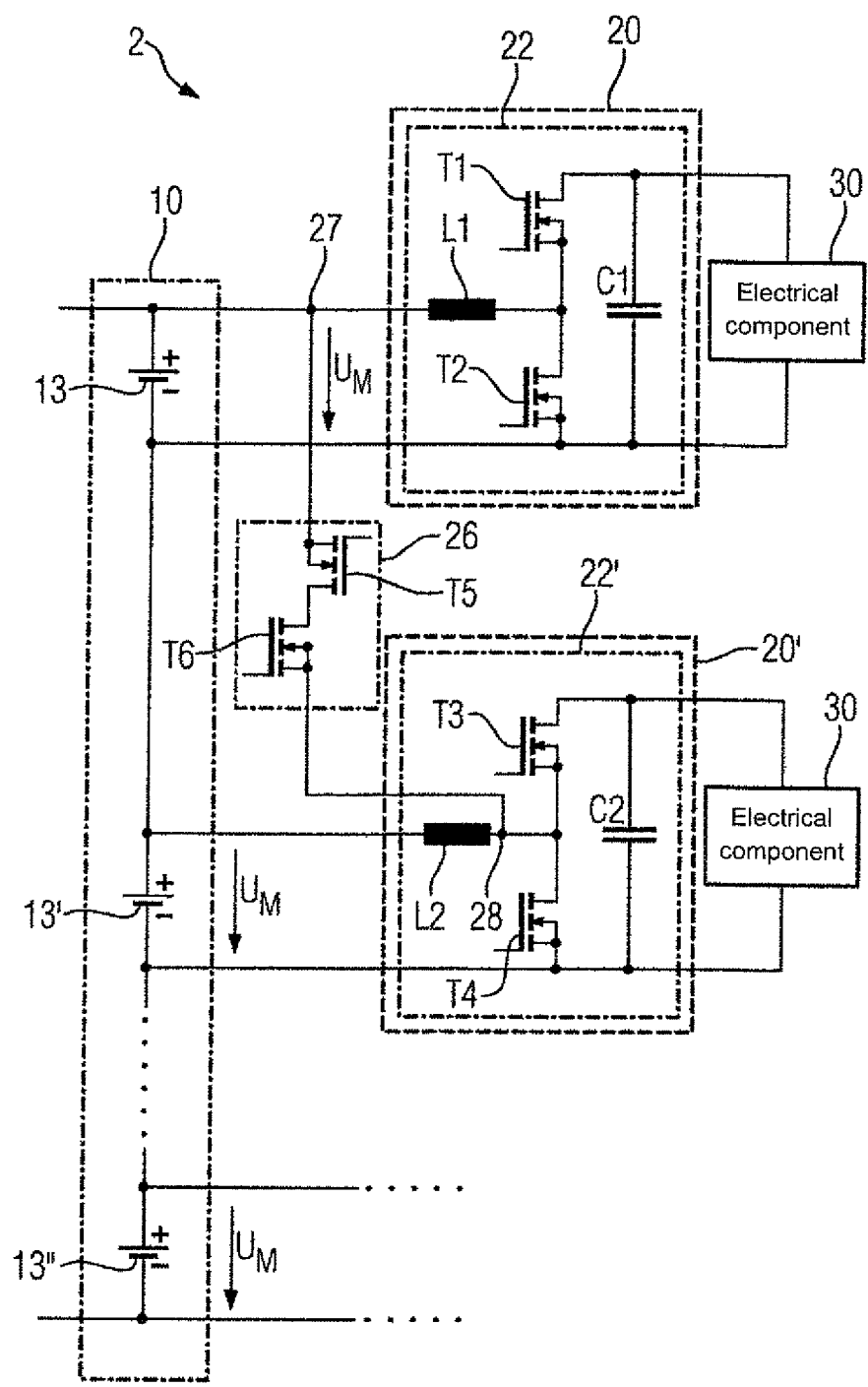
FIG. 2 illustrates schematically an exemplary embodiment of the apparatus according to the present invention.

FIG. 2 shows a state of charge compensation apparatus 2 which can be disposed in the drive arrangement according to FIG. 1. The apparatus 2 comprises a battery system 10 consisting of a series connection of a plurality of battery sub-modules 13, 13', 13". In this exemplary embodiment, the battery system consists of the series connection of a first battery sub-module 13, a second battery sub-module 13', and a third battery sub-module 13". Other battery sub-modules may also be provided in the apparatus 2.

The battery sub-modules 13, 13', 13" may exhibit different states of charge. A battery sub-module voltage $U_M$ is dropped across each of the battery sub-modules 13, 13', 13". A voltage conversion module 20, 20' can be connected to each of the battery sub-modules 13, 13', 13". The voltage conversion modules 20, 20' can be of identical design. In this exemplary embodiment, a first voltage conversion module 20 is connected to the first battery sub-module 13 and a second voltage conversion module 20' is connected to the second battery sub-module 13'. The first voltage conversion module 20 comprises a first step-up converter 22 and the second voltage conversion module 20' comprises a second step-up converter 22'. The step-up converters 22, 22' can also be of identical design.

An electrical component 30 can be connected to each of the voltage conversion modules 20, 20'. The step-up converter 22, 22' of the voltage conversion module 20, 20' is designed to convert the voltage $U_M$ provided by the connected battery sub-module 13, 13', 13" into a higher voltage for the electrical component 30. Each of the step-up converters 22, 22' has an inductor L1, L2, also known as a step-up converter choke, two switching elements which are here implemented as transistors T1, T2, T3, T4, and a capacitor C1, C2.

Each of the electrical components 30 can be implemented as a DC load or as an electrical machine. If the electrical component is implemented as an electrical machine, an inverter (not shown here) can also be provided which can disposed in each of the voltage conversion modules 20, 20'.

For state of charge compensation between the first battery sub-module 13 and the second battery sub-module 13', a switching device 26 is now provided which has a first terminal 27 and a second terminal 28. The switching device 26 has two switching elements T5 and T6 which are here implemented as transistors. The first terminal 27 of the switching device 26 is connected to the first battery sub-module 13. The second terminal 28 of the switching device 26 is connected to the step-up converter choke L2 of the second step-up converter 22' such that a circuit comprising the switching device 26, the first battery sub-module 13 and the step-up converter choke L2 is formed.

If the first battery sub-module 13 has a higher state of charge than the second battery sub-module 13', the switching device 26 can be controlled by way of a control device (not shown here) such that the switching element T6 is first closed. This causes energy to flow from the first battery sub-module 13 to the step-up converter choke L2. The electrical energy which is drawn from the first battery module 13 is stored in the step-up converter choke L2 as magnetic energy. Finally the switching element T6 is opened, wherein the magnetic energy stored in the step-converter choke L2 is released as electrical energy and fed via the switching element T4 implemented as a transistor to the second battery sub-module 13'. This energy flow via the transistor T4 takes place in particular via the body diode of the transistor T4. The second battery sub-module 13' is therefore charged with electrical energy from the first battery sub-module 13.

If the second battery sub-module 13' now has a higher state of charge than the first battery sub-module 13, the switching element T4 of the step-up converter 22' is first closed. This causes energy to flow from the first battery sub-module 13' to the step-up converter choke L2. The electrical energy drawn from the first battery module 13' is stored in the step-up converter choke L2 as magnetic energy. The switching element T4 is then opened and the switching element T5 closed. The magnetic energy stored in the step-up converter choke L2 is released as electrical energy and fed to the first battery sub-module 13. The first battery sub-module 13 is therefore charged with electrical energy from the second battery sub-module 13'. In this form of embodiment of the method, in which energy flows from the second battery sub-module 13' to the first battery sub-module 13, the capacitor C2 of the DC link of the second step-up converter 22' is additionally also charged. As the capacitance of the capacitor C2 of the step-up converter 22' is usually less than a capacitance of the first battery sub-module 13, the voltage across C2 rises more rapidly than across the first battery sub-module 13 when the step-up converter choke L2 is discharged. The electrical energy thereby stored in the capacitor C2 can be fed back again to the second battery sub-module 13' once the flow of energy from the second battery sub-module 13' to the first battery sub-module 13 is terminated. For this purpose the switching element T3 is closed and the switching element T5 opened, wherein the electrical energy stored in the capacitor C2 is supplied to the second battery sub-module 13'. Since, in addition to the energy flow from the second battery sub-module 13' to the first battery sub-module 13, energy is fed back from the capacitor C2 to the second battery sub-module 13', in this form of embodiment of the method the state of charge balancing takes longer than the state of charge compensation in which energy flows from the first battery sub-module 13 to the second battery sub-module 13'. The control device can be designed to set a time duration for the state of charge compensation depending on the energy flow direction in order to ensure that the state of charge compensation of each of the energy flow directions can be terminated in as low-loss a manner as possible.

The example therefore illustrates a balancing method that can be used for any loads 30, 30', 30" of the drive arrangement according to FIG. 1. Thus the submodules 40, 40', 40" can be loaded independently of one another without having to accept limitations due to the differences in the states of charge of the individual battery sub-modules 13, 13', 13".

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An apparatus for state of charge compensation, comprising:
    a battery system supplying electrical energy and comprising a first battery sub-module and a second battery sub-module connected in series with the first battery sub-module,
    a first voltage conversion module electrically connected to the second battery sub-module,
    an electrical component connected to an output of the first voltage conversion module receiving electrical energy from the second battery sub-module,
    a switching device having two switching states and configured to switch an electrical connection between the first battery sub-module and the first voltage conversion module, and
    a control device configured to control the switching device so as to enable electrical energy to flow from the first battery sub-module to the second battery sub-module or from the second battery sub-module to the first battery sub-module, or both.

2. The apparatus of claim 1, wherein the first voltage conversion module comprises an inductor, and wherein the switching device electrically connects the inductor to the first battery sub-module.

3. The apparatus of claim 1, wherein the control device is configured to control the switching device in a first of the two switching states so as to enable electrical energy to flow from the first battery sub-module to the second battery sub-module.

4. The apparatus of claim 1, wherein the control device is configured to control the switching device in a second of the two switching states so as to enable electrical energy to flow from the second battery sub-module to the first battery sub-module.

5. The apparatus of claim 3, wherein the control device is configured to set the first switching state when a state of charge of the first battery sub-module is greater than a state of charge of the second battery sub-module.

6. The apparatus of claim 4, wherein the control device is configured to set the second switching state when a state of charge of the second battery sub-module is greater than a state of charge of the first battery sub-module.

7. The apparatus of claim 3, wherein the control device is configured to control a first length of time during which the switching device is in the first switching state.

8. The apparatus of claim 4, wherein the control device is configured to control a second length of time during which the switching device is in the second switching state.

9. The apparatus of claim 1, further comprising at least one third battery sub-module and at least one second voltage conversion module.

10. A method for state of charge compensation, comprising:
   implementing an apparatus for the state of charge compensation of a battery system having a first battery sub-module and a second battery sub-module connected in series with the first battery sub-module,
   electrically connecting the first battery sub-module to a first voltage conversion module,
   connecting an electrical component to the first voltage conversion module and supplying the electrical component with the electrical energy from the second battery sub-module,
   switching, with a switching device, an electrical connection between the first battery sub-module and the first voltage conversion module, and
   controlling with a control device a flow of electrical energy from the first battery sub-module to the second battery sub-module, or
   controlling with a control device a flow of electrical energy from the second battery sub-module to the first battery sub-module.

11. The method of claim 10, further comprising:
   switching with the switching device an electrical connection between the first battery sub-module and the first voltage conversion module,
   controlling a flow of electrical energy from the first battery sub-module to the first voltage conversion module,
   converting the electrical energy transported by the flow of electrical energy into magnetic energy with an inductor disposed in the first voltage conversion module and storing the magnetic energy in the inductor,
   switching an electrical connection between the inductor and the second battery sub-module, and
   releasing and converting the magnetic energy stored in the inductor into electrical energy for the second battery sub-module.

12. The method of claim 10, further comprising:
   switching with the switching device an electrical connection between the inductor of the first voltage conversion module and the second battery sub-module,
   converting the electrical energy from the second battery sub-module transported by a flow of electrical energy from the second battery sub-module into magnetic energy by way of an inductor and storing the magnetic energy in the inductor,
   switching with the switching device an electrical connection between the inductor to the second battery sub-module,
   controlling a flow of the stored magnetic energy from the inductor to the first battery sub-module, and
   releasing and converting the magnetic energy stored in the inductor into electrical energy for the first battery sub-module.

* * * * *